July 13, 1954 W. DUBILIER 2,683,792
MEANS FOR MAKING METALLIZED ELECTRICAL CONDENSERS
Filed March 22, 1951
3 Sheets-Sheet 1

INVENTOR
WILLIAM DUBILIER
BY
ATTORNEY

July 13, 1954   W. DUBILIER   2,683,792
MEANS FOR MAKING METALLIZED ELECTRICAL CONDENSERS
Filed March 22, 1951   3 Sheets-Sheet 2
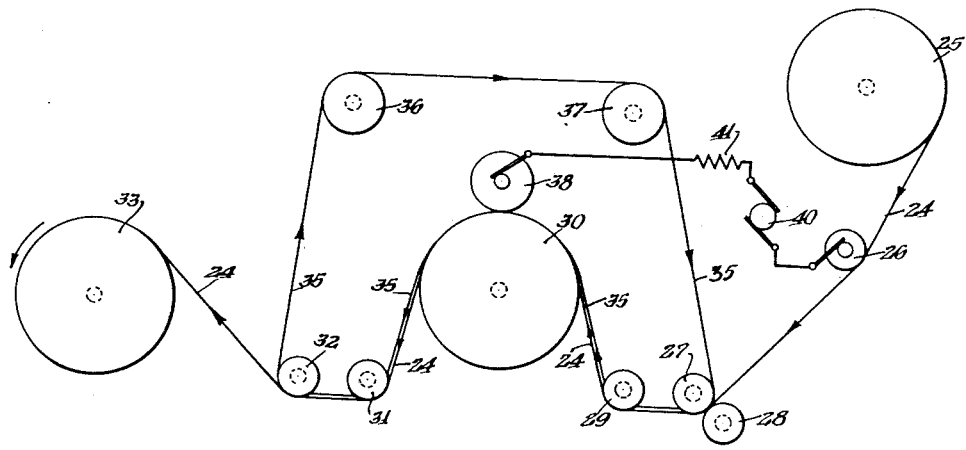
FIG. 8.
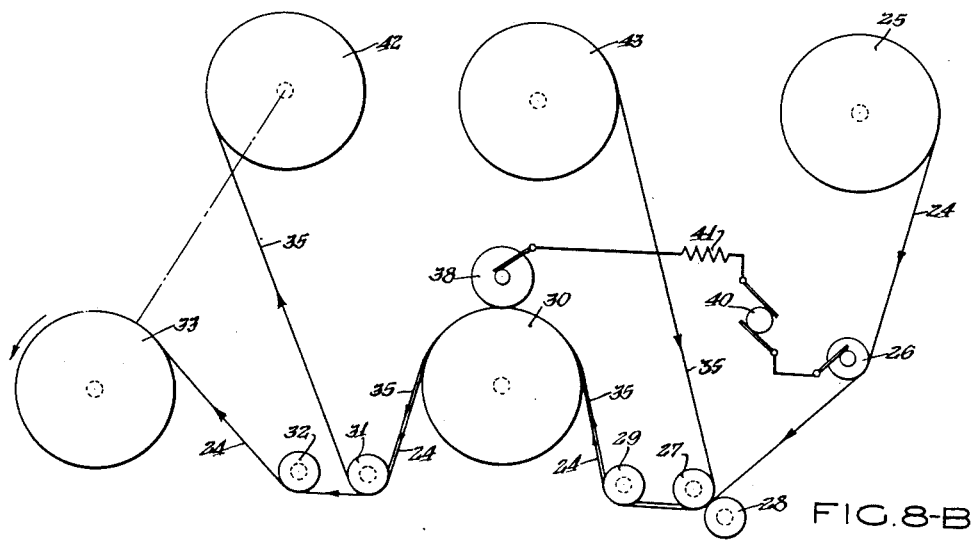
FIG. 9.
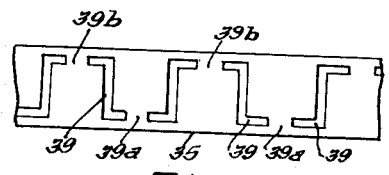
FIG. 8-A
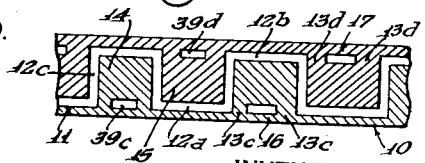
INVENTOR
WILLIAM DUBILIER
BY
ATTORNEY July 13, 1954 W. DUBILIER 2,683,792
MEANS FOR MAKING METALLIZED ELECTRICAL CONDENSERS
Filed March 22, 1951 3 Sheets-Sheet 3
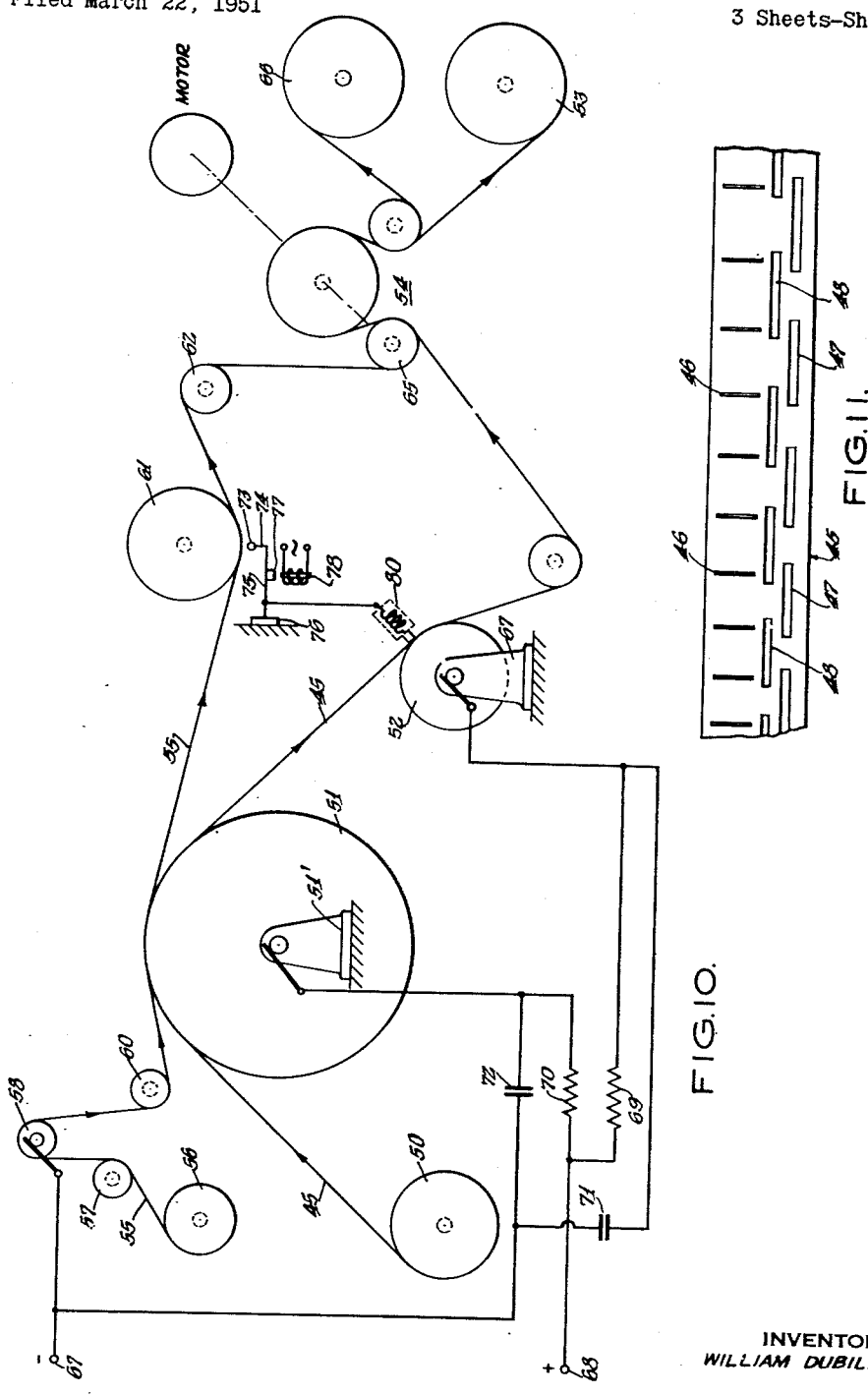
INVENTOR
WILLIAM DUBILIER
BY
ATTORNEY Patented July 13, 1954

2,683,792

UNITED STATES PATENT OFFICE 2,683,792

MEANS FOR MAKING METALIZED ELECTRICAL CONDENSERS

William Dubilier, New Rochelle, N. Y., assignor to Cornell-Dubilier Electric Corporation, South Plainfield, N. J., a corporation of Delaware Application March 22, 1951, Serial No. 216,874

10 Claims. (Cl. 219—19)

The present invention relates to electrical condensers and to apparatus and methods for use in the manufacture of such condensers, more particularly of the kind comprising a single-web or strip of metallized paper or an equivalent flexible dielectric material having a demetallized sinuous spacing track, preferably zig-zag shaped and comprising alternate longitudinal and transverse sections burnt by electrical discharge at spaced intervals in the metallic layer or coating applied to the strip, to provide successive metallized areas which, when the strip is rolled, for example so as to form a right-cylindrical unit, mutually cooperate or register to constitute the electrodes of opposite polarity of the condenser.

Such a condenser comprising only a single element or metal coated strip of paper or equivalent material, in addition to the general advantage of metallized paper condensers of reducing the size and bulk of the condensers and being capable of automatic regeneration or self-healing when subjected to breakdown excess voltage, enables the use of a greatly simplified manufacturing technique, especially in case of condensers of small size and capacity, in that only a single element or strip has to be wound, thus eliminating the precautions and difficulties of guiding and aligning a number of strips during the fabrication of the condenser units.

In the case of single-web metallized condensers of the above type, wherein the electrodes of opposite polarity are all formed from a single metallized coating on one and the same dielectric strip by burning a sinuous or zigzag track comprising successive longitudinal and transverse spacing track sections at intervals longitudinally spaced apart in the metallized coating, the burning or branding element, such as a wheel or roller, has to be furnished with a pattern or "repeat" which will burn the transverse spacing tracks at the requisite intervals.

In such a condenser, it will be apparent that, as successive convolutions are wound, the circumference of the roll increases. For example, when the roll is right-cylindrical, the circumference for each convolution increases by an increment $2\pi T$ over that for the preceding convolution, where T is the thickness of the strip. The branding wheel must not only, therefore, have a circumference sufficient for the subdivision of the whole length of the metallized surface on the strip, but the pattern or repeat engraved or otherwise formed on the tread of the wheel must be such as progressively to increase the spacings between the successive transverse tracks by the said increment, in such a manner that the width of each successive electrode area in the lengthwise direction of the strip corresponds exactly to the respective circumference or convolution in the wound unit, to cause the areas of opposite polarity to overlap and effectively to cooperate throughout the wound condenser unit.

If the branding elements were applied so as to burn the transverse tracks at equal intervals apart along the metallized strip and the strip then rolled up, it will be apparent that each successive metallized area would lap a smaller proportion of the circumference of the roll, since the said circumference increases with each convolution. The metallized areas would not then register with each other so as to effectively cooperate as electrodes of opposite polarity.

While such a branding wheel may be suitable for use in producing condensers of small dimensions and capacitance, the size of the wheel required for condensers of larger dimensions and capacitance, for example of 0.1 microfarad or more, becomes impractically large. Furthermore, the necessity of providing a large number of wheels each for a particular size and type of condenser becomes prohibitive both from the standpoint of cost and bulk, where condensers for widely varying capacities and operating voltages are to be produced.

In my United States patent application Serial No. 205,814, filed January 12, 1951, entitled Means for and Method of Manufacturing Electrical Condensers, there is described a method of and apparatus for patterning or demetallizing a metallized insulating strip such as paper, preparatory to its winding into a convolute spiral single-web condenser unit, whereby the intervals between successive transverse spacing tracks upon the strip can be determined at will during the patterning operation. This is accomplished principally by controlling the relative speed between one or more branding or demetallizing elements and the strip to be patterned, and/or by controlling or timing the electric spark or demetallizing currents relative to the speed of the strip, in such a manner as to effect a progressive variation of the spacing distances between the transverse track sections, to thereby cause the alternate electrode areas of opposite polarity to substantially register throughout the length of the strip upon subsequent winding thereof into a convolute spiral or rolled condenser unit.

An object of the present invention is the provision of a modified as well as efficient method of and apparatus for patterning a metallized strip of insulating material for producing single-web wound condensers, which eliminates the use of bulky patterning wheels or equivalent demetallizing elements, as well as the problem of synchronism or control of the relative speed between the strip and demetallizing electrodes and/or the timing of the demetallizing currents.

With the foregoing general object in view, the present invention involves the provision of a punched control tape or stencil of insulating material, such for example as paper or plastic, superimposed upon the metallized insulating strip and moving therewith at equal speed past a sparking electrode, such as a wheel or roller, to effect a direct burning or cooperation of the metallized surface at the cut-out or opening spaces of said tape. For this purpose, the control tape or stencil, which may be of small size and weight compared with the patterning wheels heretofore being used, is provided with a cut-out track forming the electrical replica of the insulating track required for the particular size or type of condenser to be produced.

An advantage of this method of demetallizing, especially in respect to the transverse track section, is the fact that a well-defined and narrow or demetallized line may be produced upon the metallized strip in a most simple and efficient manner. Furthermore, any problem of controlling or maintaining a proper sparking distance between the metallized surface and the demetallizing electrode, is substantially eliminated by the proper choice of the thickness of the control tape or stencil.

The invention will become more apparent from the following detailed description considered in conjunction with the accompanying drawings, forming part of the specification, and wherein:

Figure 8 illustrates diagrammatically a simple patterning or demetallizing apparatus using a punched tape or stencil for directly burning the insulating track in accordance with the invention;

Figure 8A shows a stencil tape suitable for use in connection with the invention;

Figure 8B shows a patterned metallized strip obtained by means of the invention, using a tape as shown in Figure 8A;

Figure 9 shows a modification of Figure 8;

Figure 10 shows another modification of patterning apparatus according to the invention using a stencil tape for directly burning of the transverse sections and for indirectly controlling the burning of the longitudinal sections of the zig-zag shaped insulating track; and Figure 11 shows a punched stencil and control tape suitable for use with the apparatus shown in Figure 10.

Like reference characters identify like elements in the different views of the drawings.

Figure 1:
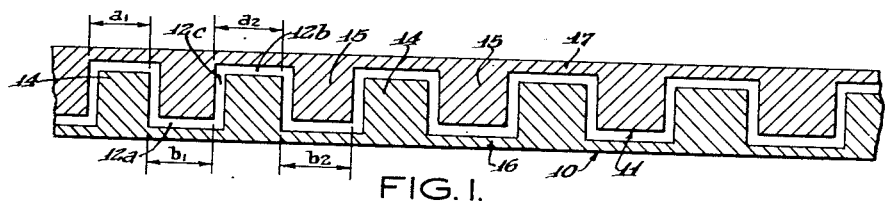
Figure 1 shows a metal coated insulating strip having a right-angular zig-zag shaped insulating track, to provide alternate interlocking electrode areas of opposite polarity adapted to register in the wound unit, in a manner customary in the construction of wound single-element metallized paper condensers.
Figure 6:
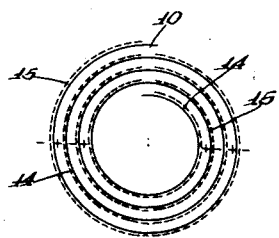
Figures 6 and 7 illustrate diagrammatically rolled units obtained with patterned metallized strips shown in Figures 2 and 4, respectively.

Referring more particularly to Figure 1, there is shown a metallized paper strip 10 provided with a sinuous or zig-zag shaped insulating track 11 produced by burning away or evaporating the metal coating by means of suitable sparking electrodes, said track comprising alternate longitudinal sections 12a and 12b parallel to the opposite edges of the strip and interconnected by transverse sections 12c, to form a continuous zig-zag shaped insulating track. As a result, there are provided alternate and interlocking electrode areas 14 and 15 which are electrically connected by continuous metal strips or marginal areas 16 and 17, respectively. The widths $a_1$, $b_1$, $a_2$, $b_2$, $a_3$, etc., of the successive electrode areas along the length of the strip increases gradually, as indicated in the drawing, in such a manner that, as the strip is wound upon a mandrel into a convolute or rolled condenser, the width of each electrode area exactly equals or laps the circumference of the rolled unit, whereby the adjacent areas 14 and 15 of opposite polarity register and effectively cooperate to provide an operative condenser unit or section, as shown in Figure 6. As will be understood, the variation of the width of the successive electrode areas in the longitudinal direction of the strip is dependent both upon the thickness of the paper as well as upon the size or diameter of the condenser unit or mandrel upon which the strips are to be wound.

Figure 2:
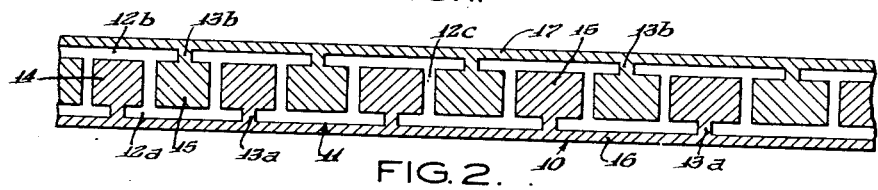
Figure 2 shows a similar metallized strip having a modified spacing pattern or track.

Referring to Figure 2, there is shown a metallized strip with an improved electrode pattern or insulating track for making paper condensers according to the invention. According to this modification, the longitudinal track sections 12a and 12b are extended beyond the meeting edges with the transverse sections 12c, to ensure a safe and continuous connection between the longitudinal and transverse tracks and to prevent a direct electrical connection between adjacent electrode areas of opposite polarity.

Furthermore, this construction results in relatively narrow current paths or gaps 13a and 13b, respectively, between the marginal or connecting strips 16 and 17, and the respective electrode areas 14 and 15. As a result, in case of a puncture or short-circuit of the condenser, especially those using a single layer of paper or dielectric between the electrodes of opposite polarity, a sudden excessive current, as a result of the total condenser charge through the short-circuit point, is prevented, thus enabling the metal coating in the neighborhood of the short-circuit point or fault to be evaporated or removed without danger of destroying the paper, or ensuring a safe self-healing at the short-circuit point or fault, as described in detail in the above-mentioned co-pending application.

Figure 3:
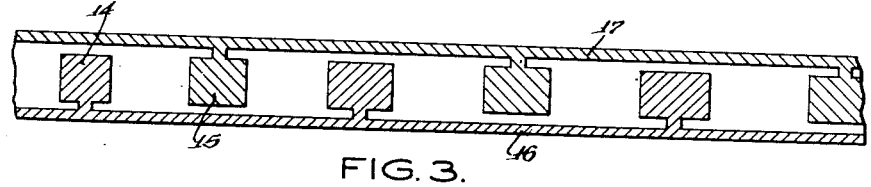
Figures 3 to 5 illustrate modified demetallized strips according to the invention, for making condensers having multiple layers of paper or dielectric, to increase the operating voltage.

Referring to Figure 3, there is shown an electrode pattern of the type according to Figure 2 for making condensers having two layers of paper or dielectric between the adjacent electrode areas 14 and 15 of opposite polarity. For this purpose, alternate full electrode areas are burnt or removed by the sparking electrode, in such a manner as to interpose a desired number of paper layers or convolutions between any two cooperating electrode areas of opposite polarity in the wound or final condenser unit, in a manner readily understood. In the same manner, the length of the spacing areas between adjacent electrodes 14 and 15 may be any multiple of the electrode areas to obtain a condenser of a desired multiple dielectric thickness.

Figure 4:
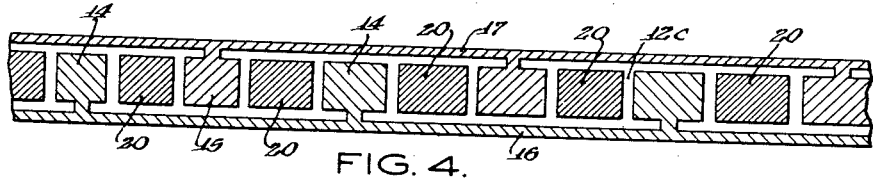

Instead of removing or burning the electrode areas in case of a double-paper condenser, as shown in Figure 3, or condensers intended to have more than two thicknesses of dielectric, the intermediate electrode areas may be left upon the strip but disconnected from the marginal areas 16 and 17, as shown at 20 in Figure 4 which is otherwise similar to Figure 3. This results in a floating electrode being interposed between the active electrodes or the equivalent of a series connection of two or more condensers and subdivision or equalization of the total operating voltage, in a manner well known in connection with floating or non-polar electrode type high voltage condensers.

Figure 5:
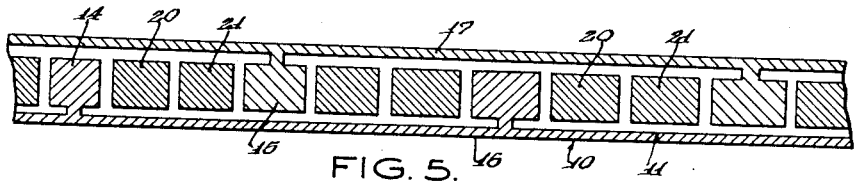

In a similar manner, the active electrode areas 14 and 15 may be spaced by areas twice the electrode width with or without floating electrodes, as shown at 20 and 21 in Figure 5, to provide a triple dielectric layer and to further increase the operating voltage. In the same manner, condensers with four and more dielectric layers may be produced, in a most simple and efficient manner.

Figure 6 shows diagrammatically a metallized strip according to Figures 1 and 2 wound into a convolute spiral condenser unit. As is seen, alternate circumferential electrode areas 14 and 15 overlap or register with each other, thus cooperating as the electrodes of opposite polarity, as indicated by the plus or minus signs in the figure. By a proper spacing control between successive transverse track sections 12c, determined both by the thickness of the paper or other insulating material used as well as the size of the condenser, a complete overlap throughout the entire roll and a maximum capacity of the condenser will be obtained, in a manner readily understood.

Figure 7:
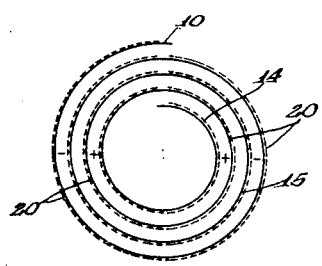

Figure 7 shows diagrammatically a wound roll or unit of the type according to Figure 4, wherein non-polar or floating electrodes 20 and paper layers are interposed between successive active electrode areas 14 and 15, to provide a condenser of increased operating voltage. If desired, the floating areas 20 may be omitted, leaving a pure layer or dielectric, by using a patterned strip of the type shown in Figure 3. In order to effect connection to the electrodes of opposite polarity, the edges of the wound units may be sprayed with a metal layer or coating to make direct contact with the marginal strips or areas 16 and 17, in a manner well known in the art.

Referring now to the patterning apparatus diagrammatically shown in Figure 8, a web or strip 24 of metallized paper or other insulating material supplied by a feed roll 25 is passed continuously with its metallized surface engaging a contact roller 26, between a pair of friction rollers 27 and 28 or an equivalent constant speed drive, around a guide roller 29, a rotatable supporting wheel 30, around a further pair of guide rollers 31 and 32 and unto a take-up spool or reel 33, the latter being driven by a suitable prime mover, such as an electric motor (not shown). A stencil or mask 35 in the form of a punched endless tape passing over suitable guide rollers or sprockets 36 and 37 is superimposed upon the metallized surface of the strip 24 by passing it between the rollers 27 and 28 together with the strip 24. As a result, the tape 35 is moved at the same speed as and in superposed relation to the strip 24 around the supporting wheel 30, the metallized surface or coating facing in the upward direction, in the example shown in the drawing. Cooperating with the paper strip and punched tape is a sparking or demetallizing electrode 38, shown in the form of a metal roller, a source of electric potential 40, such as a direct current generator, being connected between the electrode 38 and the contact roller in series with a limiting resistor 41.

The punched tape or stencil 35 which may consist of paper, plastic or any other suitable insulating material is provided with a zig-zag shaped cut-out corresponding to the track to be burned upon the metallized surface of the strip 24, that is comprising longitudinal sections and transverse sections or areas corresponding to the required insulating track or pattern, such as shown in Figures 1 to 5. As a result, small electric sparks or arcs will be set up between the metal roller 38 and the metal coating upon the strip 24 within the cut-out or open spaces of the tape 35, resulting in a burning or evaporation of the metal and a corresponding patterning of the strip, in a manner readily understood.

In carrying out the invention, it is not possible to provide the stencil tape 35 with a continuous cut-out corresponding to the zig-zag track to be produced upon the metallized paper strip, as this would result in a separation of the tape into two parts. For this reason, the cut-out of the tape 35, as shown in Figure 8, is interrupted at the center of its longitudinal sections as shown at 39a and 39b, thus resulting in a succession of alternate right and left handed Z-shaped cut-outs 39 separated by connecting portions holding the tape together.

This makes it necessary subsequently to complete the burning or removal of the metal coating at the areas 39a and 39b. This may be accomplished simply and advantageously by passing the strip 24 prior to its winding upon the take-up reel 33, past a pair of additional sparking electrodes or wheels, similar to the vibrating sparking wheel 73 shown in Figure 10 to be described hereafter, which electrodes are energized by sparking currents controlled by a pair of relays whose input circuits are directly connected or controlled by the main sparking current through the circuit of the generator 40. Since the latter is interrupted each time an insulating portion 39a and 39b of the tape 35 passes the main sparking wheel 38, this interruption may be utilized for operating a relay which in turn controls the current to the auxiliary electrodes.

If both the latter are simultaneously energized during an interruption of the main current through the circuit of the generator 40, then not only will the gaps or interruptions in the longitudinal track sections 12a and 12b be completed, but additional strip-like areas 39c and 39d will be burned in the electrode areas 14 and 15, respectively, as shown in Figure 8B, in such a manner as to result in narrow connecting paths or gaps 13c and 13d between the electrodes 14 and 15 and marginal connecting strips 16 and 17, respectively, equivalent to and serving substantially for the same purpose as the connecting gaps 13a and 13b of Figure 2, as described hereinabove.

Where an endless stencil or punched tape is used as shown in Figure 8, this is especially suitable for making small condensers by patterning consecutive fractional lengths of a strip or roll which may then be cut and wound into separate condenser units. Alternatively and especially for producing condensers of larger sizes or capacitances, a relatively large tape or stencil may be used unwound from a feed roll and rewound upon a take-up reel, together with and in the same manner as the paper strip, as shown in Figure 9.

In the latter, the stencil tape 35 is wound from a reel 43 onto a reel 42 and may be provided either with a plurality of consecutive patterns each suitable for a single condenser of small capacity, or a single pattern for making a condenser of relatively large capacity. The tape is superimposed upon the metallized paper or insulating strip 24 by passing it between friction rollers 27 and 28 or an equivalent constant speed drive, in a manner similar as shown in Figure 8 and upon passing the sparking electrode 38 and guide roller 31, the tape is rewound upon the takeup reel 42. The latter is suitably driven together with the paper roll 33 by a single prime mover (not shown), through a suitable yielding coupling or slippage device, to provide for different speeds of the tape and paper strip due to a different thickness thereof, in a manner as will be readily understood.

In this manner, a number of punched control tapes or stencils of small size and bulk, each for a particular size or type of condenser, may be prepared and stored for use when required for producing condenser units within a wide range of capacity and other operating characteristics.

Referring to Figure 10, there is shown a modified form of demetallizing or patterning apparatus according to the invention for burning the transverse spacing tracks directly through the openings of the control or stencil tape and producing the longitudinal track sections by a separate contact or sparking electrode and control or timing of the sparking current by means of auxiliary openings, slots or marks provided on said tape. As will be understood, however, the apparatus shown may be adapted for producing both the transverse and longitudinal tracks directly through a suitably designed patterning tape or stencil, in a manner similar to the previous illustrations.

In the diagram, Figure 11, 45 indicates the type of stencil or mask for use in a composite patterning device according to Figure 10. The stencil or mask may consist of a strip of stout paper having a thickness of approximately 0.003 inch. Transverse slits 46 are cut in this mask, a convenient width of the slits being about .5 mm. The spacing between the slits 46 one from the other is made to steadily increase as indicated in the drawing, to suit the mandrel size upon which the condenser is wound and the increase in circumference of each turn for a given paper thickness, as the strip is subsequently wound into a rolled condenser unit. There are furthermore shown in Figure 11 longitudinal slots or cut-outs 47 and 48 which may be of any suitable width and serve for indirectly controlling the burning or demetallizing of the longitudinal track sections by means of a separate sparking wheel or electrode to be described hereafter.

Referring to Figure 10, the mask or stencil strip 45 being unwound from a reel 50, passes over a metal or sparking roller 51, past a second metal roller 52 and is rewound or coiled-up unto a take-up reel or bobbin 53, after passing through a constant speed drive 54 together with the paper strip to be patterned or demetallized.

The metallized paper strip 55 with its metallized surface facing downward comes off the supply or feed roll 56 and passes around the guide and contact rollers 57, 58 and 60 and over the top surface of the sparking roller 51 in contact with the top of the mask or stencil 45, whence it passes under a further roller 61 and unto the take-up bobbin or reel 66, after passing through the constant speed drive 54 together with the stencil or tape 45.

The direct current electric supply is connected to terminals 67, 68, having a convenient voltage, practically around 500 to 600 volts. The roller 58 making contact with the metallized surface of the strip 55 and connected to the terminal 67 of the electric supply, may be connected to the body or frame of the machine, in which case the sparking wheel or roller 51 must be insulated as indicated at 51'. Similarly, the second roller 52 is shown supported on a bearing 67 which is also insulated from the frame or support so that it may be connected to the live side or terminal 68 of the electric supply through a limiting resistor 69.

The insulated roller 51 is likewise connected to the live side or terminal 68 of the voltage supply through a limiting resistor 70. Shunt condensers 71 and 72 are shown connected across the sparking gaps. In practice, it is necessary that these condensers be arranged close up to the actual rollers or electrodes, so that there are no long lengths of leads between the points of connection of the condensers and the condensers themselves.

The drive 54 preceding the take-up bobbins or reels 53 and 66, which may be of any known type, such as in the form of a capstan device, as indicated in the drawing, commonly used in connection with tape or paper drives, serves to cause the metallized paper strip 55 and the control mask or stencil 45 to travel over the sparking roller 51 at the same speed, or in other words, to prevent any relative movement or slippage between the tape 45 and paper strip 55. As a result, the passage of each slit 46 in the mask or stencil 45 enables the sparks to pass from the roller 51 to the metallized surface on the paper 55 and to burn away or evaporate a transverse slit in the metal coating corresponding to the slit in the stencil or mask.

In a similar manner, the longitudinal tracks connecting the transverse tracks could be burned simultaneously with the latter by using a stencilled tape or mask having a pattern corresponding to the full or continuous insulating track, such as shown in Figures 1 and 5. According to an alternative arrangement, as shown in Figure 10, the direct burning or demetallizing is employed for producing the transverse sections only, the longitudinal sections being produced by a separate sparking wheel or electrode and control of the sparking current by the aid of the auxiliary slots 47 and 48 or equivalent marks upon the tape 45 and cooperating contacting or pick-up devices as shown in Figure 10.

More particularly, in the example shown, the side or longitudinal lines or track sections to complete the pattern on the metallized strip 55 are put on by means of a small contact or sparking wheel 73 carried on a rod 74 which is secured to the free end of a resilient flat spring or reed 75 mounted cantilever fashion at 76 and being insulated from the frame of the machine. The spring 75 furthermore carries a magnetic armature 77 cooperating with an iron core coil 78. This coil is conveniently energized by an alternating current of 50 to 60 cycles per second, whereby the sparking wheel 73 is kept in vibration against the surface of the metallized paper 55, thus insuring a reliable and uniform discharge or spark and burning or demetallizing of the longitudinal lines or track sections.

In order to control the burning of the longitudinal track sections, the contact wheel 73 is connected to a contact brush 80 which is held by spring pressure against the stencil strip or mask 45 where it passes the roller 52. This contact brush is arranged to follow either of the tracks or slots 47 and 48 in the stencil or mask 45, whereby the latter act as switching means for controlling the supply of current through the resistor 69 to the burning wheel or roller 73. The length of the slots 47 and 48 controls the length of time that the wheel 73 burns away the longitudinal line or track section to join up the ends of the transverse slots or sections burnt in the paper by means of the current passing through the slits 49 and between the sparking wheel 51 and the metallized surface.

Only a single sparking wheel 73 has been shown in the drawing cooperating with one set of control slots 47 or 48 of the stencil 45. As will be understood a similar sparking wheel and connecting or sliding brush 80 (not shown) is provided for burning the longitudinal lines or tracks on both sides of the metallized paper strips.

In place of directly controlling the sparking currents of the wheel 73 by the contact brush 80, the latter may control a separate low voltage current which in turn serves to operate a relay controlling the high-voltage sparking currents.

In place of a single insulating pattern or track produced upon a narrow metallized strip, the apparatus described may be adapted for simultaneously producing a plurality of adjacent or parallel patterns upon a relatively wide strip or web by means of a patterning tape or stencil of corresponding design having a plurality of parallel cut-out patterns, said web being subsequently cut into partial strips which are subsequently wound into individual condenser units.

In Figure 10, the branding element 73 has been described as being brought into "contact" with the metallized coating. This is to be interpreted more as a close approach or sparking contact, rather than actual physical contact. To secure adequate burning away or cooperation of the metallized coating, there must be a passage of small sparks or arcs between the coating and the branding element. A minute separation of the coating and element thus appears to be necessary, whether obtained by their actual spacing apart or by progressive burning away of the coating from the edges of the pattern on the branding element, or from the point of mechanical contact so that a small spacing is obtained for maintaining the arcing. In some instances, however, it may prove more practical to bring the branding element into actual contact with the metallized coating so as to start the flow of electric current and then to retract the branding element slightly. Alternatively, actual physical contact may be avoided and a surge or transient at increased voltage may be applied across the gap to initiate current flow which will thereafter be maintained by the normal D. C. supply at, say, 400 to 600 volts. Thus, where the branding is effected directly through the open spaces of the tape, as for the transverse tracks in the example described, a uniform sparking distance is insured by the proper choice of the thickness of the tape or stencil, while in the case where no stencil is used, as in burning the longitudinal tracks by the electrode 73 in the example of Figure 10, uniform sparking current control or demetallization is apparent by the continued vibration of the electrode 73, in the manner described.

The term "zig-zag shaped" as used in the specification and claims to define the insulating track burned upon the metallized strip is intended to define broadly a demetallized track consisting of longitudinal and transverse lines or sections of substantially equal width, Figures 1 and 2, as well as tracks where the transverse portions or sections have a width equal to or being a multiple of the respective electrode areas, Figure 3, to produce condensers with multiple dielectric layers, in the manner described in detail hereinabove. In other words, the zig-zag shaped insulating track results in interlocking alternate electrode areas of opposite polarity registering in the finally wound unit and being separated either by narrow transverse track sections to obtain a single paper condenser or being separated by transverse insulating or demetallized areas equal to or being a multiple of the width of the electrode areas, to obtain a multiple paper condenser.

As is understood, the metallized paper used may be of any type coated by condensing a suitable metal, such as zinc, cadmium, aluminum, etc., by a vaporizing process, or by any other suitable process. Furthermore, the paper may be coated by a very thin layer of lacquer to increase the breakdown strength and to obtain a more uniform dielectric thickness. The metallized paper may be subjected to an electric burnout test by passing it over one or more metal cylinders with the metallized side out and applying an electric potential, preferably in impulse form or during short time periods, to remove defective spots or short-circuits, in a manner well known.

In the foregoing, the invention has been described with specific reference to a few illustrative devices and arrangements. It will be apparent, however, that numerous variations and modifications, as well as the substitution of equivalent elements, for those shown and disclosed for illustration, may be made without departing from the broader scope and spirit of the invention as set forth in the appended claims. The specification and drawings are accordingly to be regarded in an illustrative rather than in a limiting sense.

I claim:

1. In the art of manufacturing wound electrical condensers of the type comprising a single strip of dielectric material having a metallized coating on one face thereof and a narrow zig-zag shaped demetallized track running along said coating, to provide alternate adjacent metallic areas registering and cooperating with each other as condenser electrodes of opposite polarity, if said strip is wound into a convolute spiral condenser unit, an arrangement for demetallizing a coated strip preparatory to its winding into a condenser unit comprising an insulating tape having a cut-out corresponding to the demetallized track to be produced upon said strip, a sparking electrode, means for continuously superimposing successive portions of the metallized surface of said strip upon and in close contact with the successive portions of said tape, while moving the superposed portions of said strip and tape at equal speed past said sparking electrode, said sparking electrode facing the metal coating upon said strip, and means for maintaining an electric discharge between said coating and said electrode, to remove the metal within the cut-out areas of said tape and to thereby produce a continuous demetallized track upon said strip.

2. In the art of manufacturing wound electrical condensers of the type comprising a single strip of dielectric material having a metallized coating on one face thereof and a narrow zig-zag shaped demetallized track running along said coating, to provide alternate adjacent metallic areas registering and cooperating with each other as condenser electrodes of opposite polarity, if the strip is wound into a convolute spiral condenser unit, an arrangement for demetallizing a metal coated strip preparatory to its winding into a condenser unit comprising a support, a sparking electrode, an insulating tape having a cut-out corresponding to the demetallized track to be produced upon said strip, constant speed drive means for passing successive superposed portions of said strip and tape between and in close contact with said support and electrode with said tape being superposed upon the metal coating of said strip and facing said electrode, and means including sliding contact means engaging said metal coating, for maintaining an electric discharge between said coating and said electrode, to remove the metal within the cut-out areas of said tape and to thereby produce a continuous demetallized track upon said strip.

3. In the art of manufacturing wound electrical paper condensers of the type comprising a single paper strip having a metallic coating upon one face thereof and a zig-zag shaped narrow demetallized track running along said coating and comprising alternate longitudinal track sections close to and spaced from the opposite sides of said strip and connected by transverse track sections, to provide adjacent alternate rectangular metallic areas registering and cooperating with each other as condenser electrodes of opposite polarity, if the strip is wound into a convolute spiral condenser unit, an arrangement for demetallizing a coated paper strip preparatory to its winding into a condenser unit comprising an insulating tape having a cut-out corresponding to the demetallized track to be produced upon said strip, a sparking electrode, means for continuously superimposing successive portions of the coating of said strip upon successive portions of said tape, while moving the superposed portions of said strip and tape at equal speed past and in close contact with said sparking electrode, said sparking electrode facing the coating of said strip, and means including a source of electric voltage for maintaining a spark discharge between said electrode and said coating, to melt and evaporate the metal within the cut-out areas of said tape and to thereby produce a continuous demetallized track along said strip.

4. In the art of manufacturing wound electrical paper condensers of the type comprising a single paper strip having a metallized coating upon one face thereof and a narrow zig-zag shaped demetallized track running along said coating and comprising alternate longitudinal track sections close to and spaced from opposite sides of said strip and connected by transverse track sections, to provide alternate adjacent rectangular metallic areas registering and cooperating with each other as condenser electrodes of opposite polarity, if the strip is wound into a convolute spiral condenser unit, an arrangement for demetallizing a coated strip preparatory to its winding into a condenser unit comprising a support, a sparking electrode, an insulating tape having a cut-out corresponding to the demetallized track to be produced upon said strip, constant speed drive means for simultaneously unwinding and rewinding said strip and tape and passing successive superposed portions of said strip and tape betwen and in close contact with said support and electrode, the coating upon said strip and superposed tape facing said electrode, and means including sliding contact means engaging said coating for maintaining an electric spark discharge between said coating and said electrode, to melt and evaporate the metal within the cut-out area of said tape and to thereby produce a continuous demetallized track upon said strip.

5. In the art of manufacturing wound electrical condensers of the type comprising a single strip of dielectric material having a metallized coating on one face thereof and a narrow zig-zag shaped demetallized track running along said coating, to provide alternate adjacent metallic areas registering and cooperating with each other as condenser electrodes of opposite polarity, if the strip is wound into a convolute spiral condenser unit, an arrangement for demetallizing a coated strip preparatory to its winding into a condenser unit comprising an electrically conducting sparking wheel, an insulating tape having a cut-out corresponding to the demetallized track to be produced upon said strip, constant speed drive means for simultaneously unwinding and rewinding both said strip and tape from separate supply reels unto two separate take-up reels, while continuously passing successive superimposed portions of said strip and tape in close engagement with said wheel, the metal coating of said strip facing said wheel and said tape being interposed between said strip and said wheel, and means for maintaining an electric potential difference between said wheel and said coating, to remove the metal within the cut-out areas of said tape and to thereby produce a continuous demetallized track upon said strip.

6. In the art of manufacturing wound electrical paper condensers of the type comprising a single paper strip having a metallized coating upon one face thereof and a narrow zig-zag shaped demetallized track running along said coating and comprising alternate longitudinal track sections close to and spaced from the opposite sides of said strip and connected by transverse track sections, to provide alternate adjacent rectangular metallic areas registering and cooperating with each other as condenser electrodes of opposite polarity, if said strip is wound into a convolute spiral condenser unit, an arrangement for demetallizing a coated paper strip preparatory to its winding into a condenser unit comprising an electrically conducting sparking wheel, an insulating tape having a cut-out corresponding to the demetallized track to be produced upon said strip, constant speed drive means for simultaneously unwinding and rewinding both said tape and strip from separate supply reels unto seprate take-up reels, while continuously passing successive superposed portions of said strip and tape in close engagement with said sparking wheel, the metal coating of said strip facing said wheel and said tape being interposed between said strip and said wheel, and means for applying an electric potential difference between said coating and said wheel, to maintain a spark discharge therebetween and to melt and evaporate the metal within the cut-out areas of said tape, to thereby produce a continuous demetallized track upon said strip.

7. In the art of manufacturing wound electrical paper condensers of the type comprising a single paper strip having a metallized coating upon one face thereof and a narrow zig-zag shaped demetallized track running along said coating and comprising alternate longitudinal track sections close to and spaced from the opposite sides of said strip and connected by transverse track sections, to provide alternate adjacent rectangular metallic areas registering and cooperating with each other as condenser electrodes of opposite polarity, if said strip is wound into a convolute spiral condenser unit, an arrangement for demetallizing a coated paper strip preparatory to its winding into a condenser unit comprising a first electrical sparking wheel, an insulating tape having spaced transverse slots corresponding to the transverse track sections to be produced upon said strip, constant speed drive means for simultaneously unwinding and rewinding both said tape and strip from separate supply reels unto separate take-up reels, while continuously passing successive superposed portions of said strip and tape in close engagement with said sparking wheel, the metal coating of said strip facing said wheel and said tape being interposed between said strip and said wheel, means for applying an electric potential difference between said coating and said wheel, to maintain a spark discharge therebetween and to melt and evaporate the metal within the cut-out areas of said tape, a pair of further sparking electrodes, and means controlled by said tape for applying timed sparking currents between said last mentioned sparking electrode and said coating, to produce demetallized longitudinal track sections, to form a continuous demetallized track upon said strip.

8. Apparatus for demetallizing a selected area of a strip of insulating material provided on one side with a thin coherent metallic coating which comprises means for passing said strip past a demetallizing electrode extending substantially across the width thereof and facing said coating, further means for passing an insulating tape in close contact with and interposed between said strip and said electrode, said tape having a cut-out portion conforming to the area to be demetallized, and means for maintaining a continuous electric discharge between said coating and said electrode, to melt and vaporize said coating at an area defined by said cut-out portion.

9. Apparatus for demetallizing a selected area of an insulating strip provided on one side with a thin coherent metallic coating comprising means for passing said strip past a demetallizing electrode roller extending substantially across the width thereof and facing said coating, further means for passing an insulating tape in close contact with and interposed between said strip and said roller, said tape having a cut-out portion conforming to the area to be demetallized, and means for maintaining a continuous electric discharge between said roller and said coating, to melt and vaporize said coating at an area defined by said cut-out portion.

10. Apparatus for demetallizing a selected area of an insulating strip provided on one side with a thin coherent metallic coating comprising a demetallizing electrode sized to extend substantially across the width of said strip and arranged to face said coating, an insulating spacing tape in close contact with and interposed between said strip and said electrode, said spacing tape having a cut-out portion conforming to the area to be demetallized, and means to produce an electric discharge between said coating and said electrode, to melt and vaporize said coating at an area defined by said cut-out portion.

References Cited in the file of this patent

UNITED STATES PATENTS

| Number | Name | Date |
| --- | --- | --- |
| 1,909,079 | Steerup | May 16, 1933 |
| 2,022,587 | Cunningham | Nov. 26, 1935 |
| 2,216,558 | Ortlieb | Oct. 1, 1940 |
| 2,216,559 | Ortlieb | Oct. 1, 1940 |
| 2,248,057 | Bond | July 8, 1941 |
| 2,316,388 | Annis | Apr. 13, 1943 |
| 2,435,441 | Grouse | Feb. 3, 1948 |
| 2,549,966 | Grouse | Apr. 24, 1951 |